United States Patent Office 3,326,780
Patented June 20, 1967

3,326,780
EXTRACTIVE DISTILLATION OF HEXAFLUORO-
PROPYLENE EPOXIDE MIXTURE
Herbert Albert Wiist, Vienna, W. Va., assignor to E. I. du
Pont de Nemours and Company, Wilmington, Del., a
corporation of Delaware
No Drawing. Filed Dec. 29, 1964, Ser. No. 422,025
7 Claims. (Cl. 203—60)

This invention relates to the purification of hexafluoropropylene epoxide, and, more particularly, to the separation of the epoxide from hexafluoropropylene by extractive distillation.

Hexafluoropropylene epoxide is produced by the autoxidation of hexafluoropropylene. The crude product of the oxidation contains hexafluoropropylene together with several by-products. Some of the by-products may be removed without difficulty by common techniques of scrubbing and distillation; however, hexafluoropropylene boils too closely to hexafluoropropylene epoxide (−29.4° C. and −27.4° C., respectively) to permit separation by conventional distillation. Chemical reaction may be employed to separate the components with the attendant or accompanying loss of hexafluoropropylene or the necessity for costly processing to recover the reacted material.

The present invention is realized by employing an extractive distillation to separate the above-mentioned epoxide from hexafluoropropylene after the crude product from the autoxidation has been distilled to remove materials which differ substantially in boiling point from the above-mentioned fluorocarbons. The efficiency of the extractive distillation relies upon the selective effect of a third component which depresses the volatility of hexafluoropropylene and increases the relative volatility of the fluorocarbons so that they may be separated by distillation. The third component or solvent must not react chemically with the fluorocarbons so that it may be separated from the fluorocarbons by conventional distillation.

Solvents which are operable in the present process include mono-, di- and trisubstituted benzenes wherein the substituents are alkyl groups of 1-4 carbon atoms and alkoxy groups of 1-4 carbon atoms, dialkyl ethers of ethylene glycol and diethylene glycol wherein the alkyl groups of the ethers have 1-2 carbon atoms, dialkyl carbonates wherein the alkyl groups have 1-4 carbon atoms, carbon tetrachloride and chloroform. The solvent may be present in a weight ratio to the fluorocarbons of from about 1:1 to about 1000:1, and preferably from about 10:1 to 80:1. Examples of solvents which have been found to be operable in the present invention and which fall within the above-described class are toluene, the diethyl ether of ethylene glycol, and the diethyl ether of diethylene glycol, carbon tetrachloride, p-xylene, m-xylene, o-xylene, and isomeric mixtures thereof, anisole, p-cymene, butyl phenyl ether, and mesitylene. The preferred solvents are toluene, xylene, anisole, p-cymene, and mesitylene. Other solvents which are within the purview of the present invention include but are not limited to dimethyl carbonate, dibutyl carbonate, n-butyl benzene, isobutyl benzene, tertiary butyl benzene, di-normal-butyl benzene and methylethyl benzene, diethyl benzene, triethyl benzene, tributyl benzene, butoxy benzene, propoxy benzene, tributoxy benzene, propoxymethoxy benzene, butoxymethyl benzene, and butoxydimethyl benzene.

The optimum operating conditions will depend upon the desired purity of the epoxide and the effective number of fractionation stages in a given column. Generally, for best results, it is preferable to operate with the temperature of the solvent feed between 5 to 40° C. above the boiling point of the epoxide at the pressure of the distillation. The upper distillation temperature is dictated by relative volatility of the fluorocarbons in the presence of the solvent; i.e., the distillation becomes impractical as the relative volatility approaches 1.

The following examples are presented to illustrate and not to restrict the present invention. Parts and percentages are by weight unless otherwise noted.

Example 1

A batch distillation was conducted using a laboratory column (one inch diameter, 36 inches in height) packed with Podbielniak Heli-pak packing which by calibration with known mixtures was determined to have about 23 theoretical stages. Approximately 120 grams of a mixture containing 45 percent hexafluoropropylene and 55 percent hexafluoropropylene epoxide was charged to the pot and dimethoxyethane precooled to between −22 to −30° C., was continuously introduced into the top of the column at a rate of approximately 25 cc. per minute. Boilup was established by applying heat to the pot and the condensate was routed to provide total reflux. After equilibrium had been approached as evidenced by overhead temperature of approximately −29° C., a base temperature of −23° C. and a pot temperature of approximately +24° C., samples were taken of the overhead vapor and of the pot vapor. Analysis showed the overhead vapor to contain 99.5 mol percent hexafluoropropylene epoxide and the pot vapor to contain 38.8 mol percent of the epoxide. Calculations based on the Fenske equation indicated a relative volatility of approximately 1.30.

Example 2

Using the same equipment and procedure of Example 1, toluene cooled to approximately −40° C. was introduced at a rate of about 25 cc. per minute in place of the dimethoxy ethane of Example 1. After the system had reached equilibrium at total reflux, the overhead vapor contained 99.4 mol percent of the epoxide and the pot vapor contained 17.0 mol percent of the epoxide.

The foregoing examples illustrate the effectiveness of the separation of the present invention which is impractical with normal distillation techniques. Solvents such as ethyl acetate, dioxane, benzene, n-decane, ethanol and ethyl acetophenone which are outside of the class disclosed hereinabove but which are closely related to the above-described solvents do not depress the volatility of the hexafluoropropylene to permit separation by distillation.

As illustrated from the foregoing specification, the process of the present invention provides an economical route for the recovery of hexafluoropropylene epoxide, a valuable chemical and intermediate material.

I claim:

1. A process for the separation of hexafluoropropylene from hexafluoropropylene epoxide by extractive distillation in the presence of a normally liquid compound selected from the class consisting of mono-, di- and trisubstituted benzene wherein the substituents are selected from the class consisting of alkyl groups having 1-4 carbon atoms and alkoxy groups having 1-4 carbon atoms, dialkyl ethers of ethylene glycol and diethylene glycol wherein the alkyl groups of the ethers have 1-2 carbon atoms, dialkyl carbonates wherein the alkyl groups have 1-4 carbon atoms, carbon tetrachloride and chloroform.

2. A process for the recovery of hexafluoropropylene epoxide from a mixture of said epoxide with hexafluoropropylene which comprises distilling said mixture in the presence of a normally liquid compound selected from the class consisting of mono-, di- and trisubstituted benzenes wherein the substituents are selected from the class consisting of alkyl groups having 1-4 carbon atoms and alkoxy groups having 1-4 carbon atoms, dialkyl ethers of ethylene glycol and diethylene glycol wherein the alkyl group has 1–2 carbon atoms, dialkyl carbonates wherein the alkyl groups have 1–4 carbon atoms, carbon tetrachloride and chloroform to produce a vapor composed substantially of said epoxide and thereafter condensing said vapor.

3. The process of claim 1 wherein the normally liquid compound is toluene.

4. The process of claim 1 wherein said normally liquid compound is xylene.

5. The process of claim 1 wherein said normally liquid compound is anisole.

6. The process of claim 1 wherein said normally liquid compound is p-cymene.

7. The process of claim 1 wherein said normally liquid compound is mesitylene.

References Cited

UNITED STATES PATENTS

| | | | |
|---|---|---|---|
| 2,325,379 | 7/1943 | Durrum | 203—58 X |
| 2,706,707 | 4/1955 | Morrell et al. | 203—57 X |
| 3,101,304 | 8/1963 | Wiist | 203—67 |
| 3,125,599 | 3/1964 | Warnell | 260—348.5 X |
| 3,282,801 | 11/1966 | Wiist | 203—63 X |

FOREIGN PATENTS

| | | |
|---|---|---|
| 1,275,799 | 10/1961 | France. |
| 616,756 | 4/1962 | Belgium. |

NORMAN YUDKOFF, *Primary Examiner.*

F. E. DRUMMOND, *Assistant Examiner.*